United States Patent [19]
Tsumura

[11] Patent Number: 5,526,435
[45] Date of Patent: Jun. 11, 1996

[54] COMMUNICATIONS APPARATUS FOR SCRAMBLING DATA AND SYNCHRONIZING A PLURALITY OF TERMINALS

[75] Inventor: Mihoji Tsumura, Osaka, Japan

[73] Assignee: Ricos Co., Ltd., Osaka, Japan

[21] Appl. No.: 268,496

[22] Filed: Jun. 30, 1994

[30] Foreign Application Priority Data

Dec. 27, 1993 [JP] Japan ................................. 5-353626
Dec. 28, 1993 [JP] Japan ................................. 5-350211

[51] Int. Cl.$^6$ ................................................. H04L 9/00
[52] U.S. Cl. ................... 380/49; 380/9; 380/20; 380/23; 380/25; 380/48
[58] Field of Search ....................... 380/20, 21, 4, 380/9, 23, 25, 49, 50, 48

[56] References Cited

U.S. PATENT DOCUMENTS

| | | | |
|---|---|---|---|
| 3,789,131 | 1/1974 | Harney | 380/13 |
| 4,245,245 | 1/1981 | Matsumoto et al. | 380/7 |
| 5,159,633 | 10/1992 | Nakamura | 380/30 |

*Primary Examiner*—Bernarr E. Gregory
*Attorney, Agent, or Firm*—Thompson Hine & Flory

[57] ABSTRACT

The invention prevents unauthorized use of data in communications. When terminals with different data transmission rates are simultaneously connected to a host computer, the host computer sets a single common data communication rate to all the terminals to assure synchronization. The host computer is connected each terminal via communications network. The host computer sends a data body to each terminal over a unidirectional communications link in a cyclic manner while a bidirectional communications link is established between the host computer and each terminal. Response to an individual request from each terminal, the host computer downloads descrambling data for descrambling and a loader program for executing the data body. The host computer determines from among the terminals, any terminal having a communications means that sets the lowest data transmission rate, and sets the data transmission rates of the terminals simultaneously connected thereto to the lowest rate.

4 Claims, 6 Drawing Sheets

COMMUNICATIONS APPARATUS FOR SCRAMBLING DATA AND SYNCHRONIZING A PLURALITY OF TERMINALS

BACKGROUND OF THE INVENTION

1. Field of the Invention

The present invention is directed to a novel communications apparatus that scrambles data to be communicated in order to prevent unauthorized use of the data in wired or wireless communications. The present invention is also directed to an arrangement in which a single host computer synchronizes a plurality of terminals in transfer timing when the plurality of terminals send data in wired communications using wired line.

2. Description of the Prior Art

Thanks to advanced data transmission technology, we can enjoy communications between personal computers in an easy manner over public telephone line or dedicated line. Radio digital signal transmission technology has now matured enough to allow PCM communications to be in widespread use.

When data to be communicated is open to the public free of charge, no consideration is given to secrecy requirements of the data. Thus, the data is not subjected to any particular maneuver for this requirement; attaching a packet number and an error correction code onto the data to be communicated may be sufficient.

Since information is gaining more and more significance in today's information environment, data that requires protection are increasing accordingly. Conventionally, data to be communicated is coded by an encoder prior to transmission. A receiver has a decoder that decodes encoded data which the receiver has received. The encoding and decoding are performed according to a predetermined communication protocol.

The encoder for encoding data to be communicated has a cryptographic program for encoding the data according to predetermined sequence. Once decoded, however, the data are accumulated in a normal state. The user of a terminal may pay for a first use of the data. For subsequent use, however, the data may be available to the user free of charge. This allows practically unauthorized use, and presents a serious problem to an information provider at a host computer side. Such a system presents no problem if the data is of such a nature that it is at the user's disposal at the terminal once the host computer downloads the data to the terminal. Depending on the type of data, the information provider may want to bill the user for each service, that is, the downloading of the data. If the data is stored at the terminal, however, no subsequent service is requested, and thus no billing occurs.

In data communications, the data transmission rate is also an issue. A limitation is imposed on the data transmission rate, particularly a wired network such as wired telephone line. The data transmission rate is also dependent on the modem or interface that connects the terminal with the line. Varied transmission rates are available from a number of modems. Assuming that two computers having respective modems are linked and that one modem has a higher transmission rate than the other, the lower transmission rate overrides.

Thus, communications take place between the two computers at the lower transmission rate rather than at the higher transmission rate if one modem is faster than the other. In the system where a plurality of terminals are connected, via respective modems, to a host computer that is capable of accommodating a plurality of telephone lines, the host computer processes data on a task by task basis, and does not synchronize to the lowest transmission rate. In this case, the data rate of each terminal's modem determines the communications rate between the host computer and each terminal. The data transmission rate of the host computer is thus varied from terminal to terminal. This arrangement presents no problem in a system wherein each terminal accesses information from the host computer that stores some particular database. Other type of systems may be contemplated. For example, a plurality of terminals simultaneously access a host computer, and the host computer has to process sequentially a plurality of commands from the terminals. In such a system, the decision of data transmission rate cannot be left to the responsibility of each modem. To exemplify this, consider that a host computer stores a video game that may be simultaneously played by a plurality of terminals. Varied data transmission rates among the terminals present a problem. Terminals computers can participate in the video game which is controlled by the host computer, but input timing may be critical in enjoying a video game, particularly ones like shooting games. Differences in data rates biases some participants in their favor at the expense of others who are trying to enjoy the video game. Although the input timing of the command, that is the participant's direct responsibility is a major factor, the difference in data transmission rates among modems contributes to biased conditions of the game.

SUMMARY OF THE INVENTION

It is an object of the present invention to provide cryptographic means that prevents the repeated use of data that has been downloaded to a terminal and used once. This allows an information provider to bill the user for each service by downloading the data.

It is another object of the present invention to provide means that sets a single common data transmission rate to communications between a host computer and a plurality of terminals when the input timing from each terminal is critical in the system and where the plurality of terminals are simultaneously accessible to the host computer.

To achieve above objects, the present invention allows the host computer to send scrambled data body to a plurality of terminals over a unidirectional communications link in a cyclic manner. The host computer is linked to each terminal via a bidirectional communications network. In response to an individual service request from a terminal, the host computer downloads to each terminal, the descrambling data to descramble downloaded data and a loader program to execute the scrambled data body. The terminal stores the data body, the descrambling data, and the loader program into its external memory, transfers the loader program and the descrambling data to the available space in its main memory, and then the loader program descrambles the data body according to the descrambling data.

The host computer sets the plurality of terminals to the lowest data transmission rate available from among them.

DETAILED DESCRIPTION OF THE PREFERRED EMBODIMENT

Figure 1:
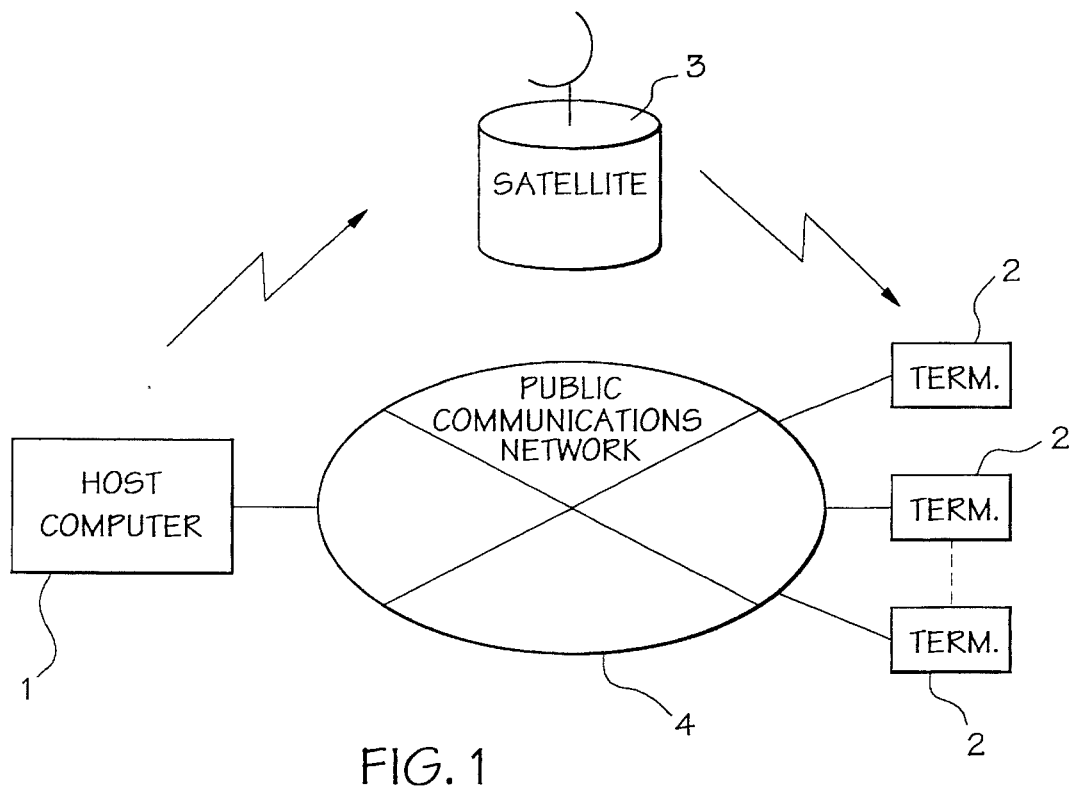
FIG. 1 is a block diagram of a communications network system using a communications satellite.
Figure 2:
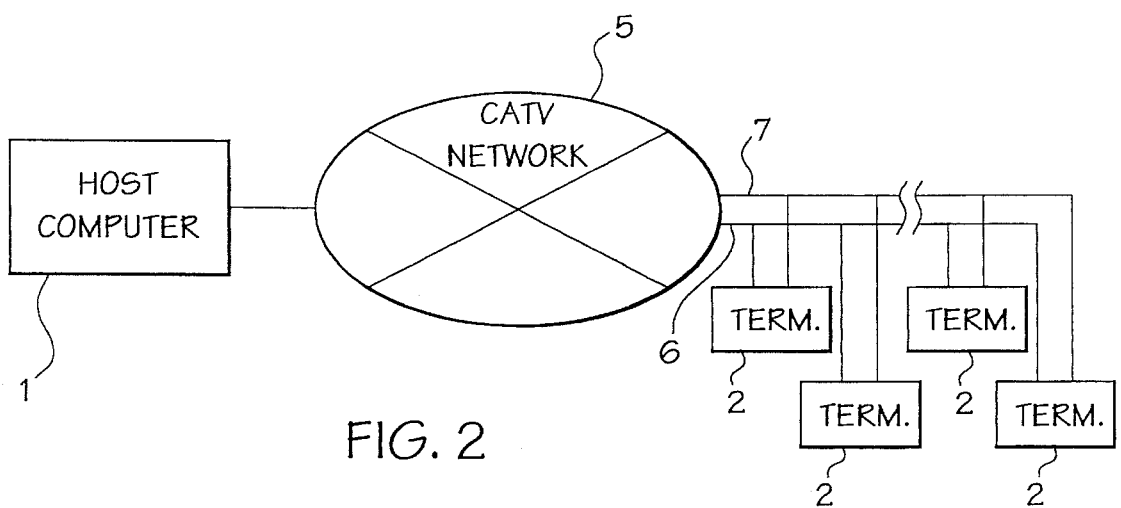
FIG. 2 is a block diagram of a communications network system using CATV network.

Referring now to the drawings, the preferred embodiments of the present inventions are discussed. Networks shown in FIG. 1 and FIG. 2 are employed as a data transmission network of the present invention. FIG. 1 shows the network system made of a communications satellite link and a public communications network as a wired link. The network system comprises a host computer 1 as an information provider, terminals 2, a communications satellite 3 and a public communication network 4 which may be digital or analogue. In the context of the present invention, it is not important whether the public communications network is digital or analogue. The host computer 1 sends unidirectional information to any terminal while bidirectional communications take place between the host computer 1 and the terminals 2 over the public communications network 4. In this embodiment, the communications satellite is employed as a radio communications link. However, a terrestrial radio communications link is a perfectly acceptable alternative.

FIG. 2 shows the network system that employs a CATV network. A host computer 1 is connected to each terminal via the CATV network 5 by any known cable link such as an optical communication link of a coaxial cable link. The CATV network 5 is interactive, 6 being upline, and 7 downline. The use of an existing CATV having only unidirectional communications capability may be contemplated. In this case, however, a public network is used for the upline 6 from each terminal 2 to the host computer 1.

The data to be communicated consists of a data body, descrambling data and a loader program. The host computer 1 sends numerous data bodies to the terminal 2 via the communications satellite 3 or the CATV network 5 in a cyclic manner, while the host computer 1 sends the descrambling data and the loader program to the terminal 2 on demand via the public network 4. When the CATV network 5 is employed, the descrambling data and the loader program are sent over a channel separate from the channel used for the transmission of the data body. In this case, the descrambling data and the loader program are subjected to necessary processing, such as attaching a unique identification code, prior to their transmission. Thus, the data to be communicated are divided between two separate transmission routes. Some of the data bodies are so large in size, that they are suited to a faster transmission rate communication, while the descrambling data and the loader program are relatively small in data size, so that they need to identify a service requesting terminal for billing purposes.

The data body to be communicated is scrambled. The descrambling data comprises scrambling parameters, a password and compressed dictionary as a type of look uptable. In the context of the present invention, the loader program is a program similar to overlay software or a macro which contains an execution file and is initiated by a certain command. The loader program is used to initiate the execution file in the data body. The loader program descrambles the data body according to the descrambling data while decompressing the data body onto the available memory space of the main memory of a terminal or an external memory device such as a hard disk unit. Then, the loader program transfers control to the descrambled data. Both the descrambling data and the loader program are decompressed into the main memory and the external memory device. After the descrambling data and the loader program are downloaded, the descrambling data in the external memory device is automatically deleted according to a predetermined sequence or is deleted or overwritten when the entire scrambled data is decoded or descrambled. Any attempt to reinitiate the data body at a later time will be aborted without the downloading of the descrambling data from the host computer. This prevents unauthorized use of data. The same effect may be achieved if the loader program is deleted or overwritten in the same manner as above.

The sequence of data processing by the terminal 2 is now discussed. From among the data that is transmitted via the communications satellite 3 or the CATV network 5 in a cyclic manner, a desired data body is retrieved. The retrieval of data may be performed in several methods. When the data body is transmitted in packet, each packet is preceded by an identification code indicative of the data body, and the terminal 2 specifies the identification code to retrieve the data. Identification codes may be transmitted in the form of a table in a cyclic manner so that the user may easily check them on the monitor screen of the terminal 2. The terminal 2 retrieves the desired data body, but the terminal 2 is unable to do on its own since the data is scrambled. The terminal 2 accesses the host computer 2 via the public communications network 4 or the CATV network 5 to request the downloading of the descrambling data and the loader program by specifying the identification code or any code corresponding to the identification code. The terminal then retrieves the desired data body. If, in this case, correspondence between a data body and its descrambling data and loader program may be implemented into a program, no input of the identification code indicative of each data body is required.

Figure 3:
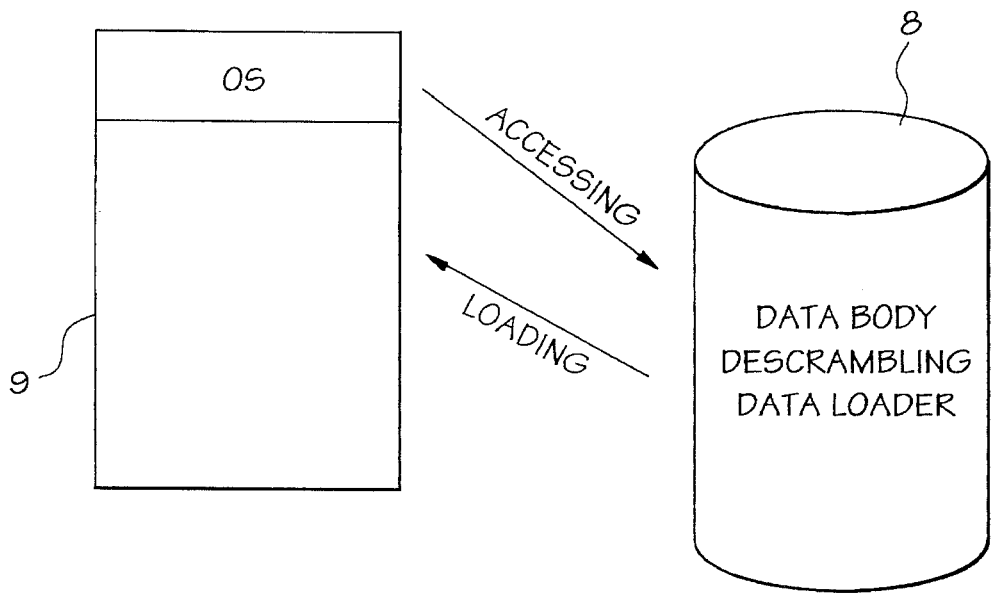
FIG. 3 is a diagram showing a terminal reading a data body, descrambling data, and a loader program into its memory.
Figure 4:
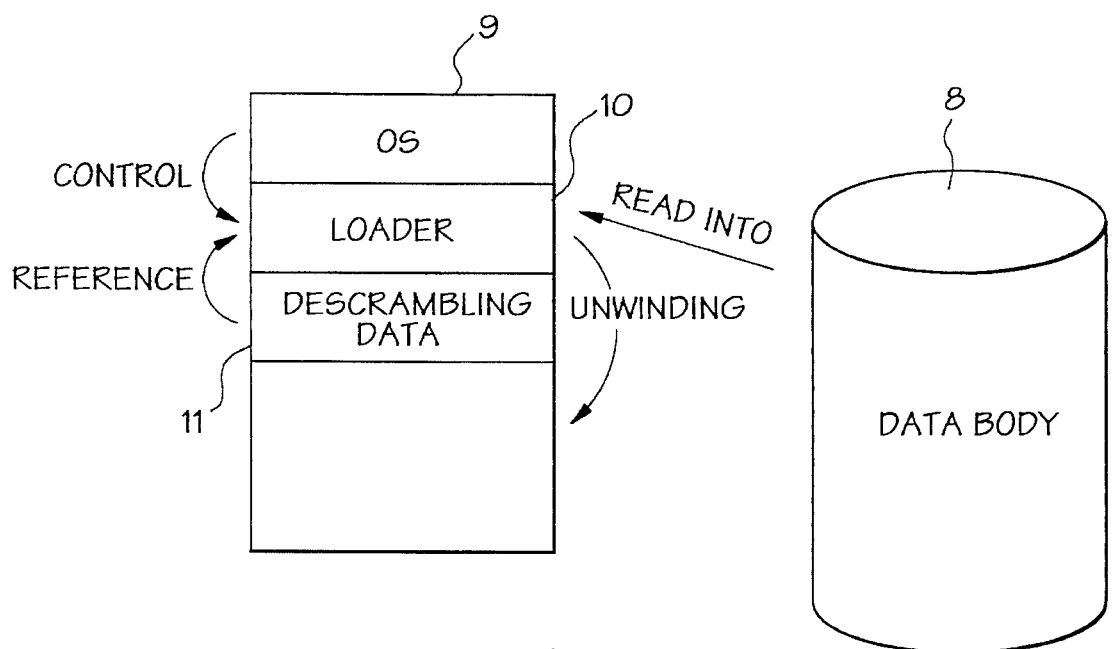
FIG. 4 is a diagram showing that the main memory reads the descrambling data and the loader.

FIG. 3 shows the state in which a terminal 2 has read a data body, its scrambling data and loader program into its memory. An external memory device such as a hard disk drive is designated 8. A memory area 9 of the main memory for executing process is already partially occupied by the operating system (OS). The external memory device 8 stores the data body, the descrambling data and the loader program in their own separate files. When initiation of the loader program is activated via a keyboard or a mouse, the OS accesses the external memory device 8, and processes the available memory space 9 of the main memory. This state is illustrated in FIG. 4. Specifically, the loader program 10 and the descrambling data 11 are transferred to the available memory space 9. Also, control is transferred from the OS to the loader program 10. The loader program 10 reads the data body in the external memory device 8 while decoding the data body according to the descrambling data. In the meantime, the descrambling data and the loader in the external memory device 8 are deleted. The timing of the deletion is not important as long as the deletion has been completed before completion of data processing at the terminal 2. It is perfectly acceptable that either the descrambling data or the loader program is deleted in the external memory device. Also, the same effect will be achieved by migration, namely parallel operations of copy and delete, instead of the above method in which the descrambling data and the loader program are once entirely copied to the memory area 9 from the external memory device 8 and then deleted at a time entirely.

Figure 5:
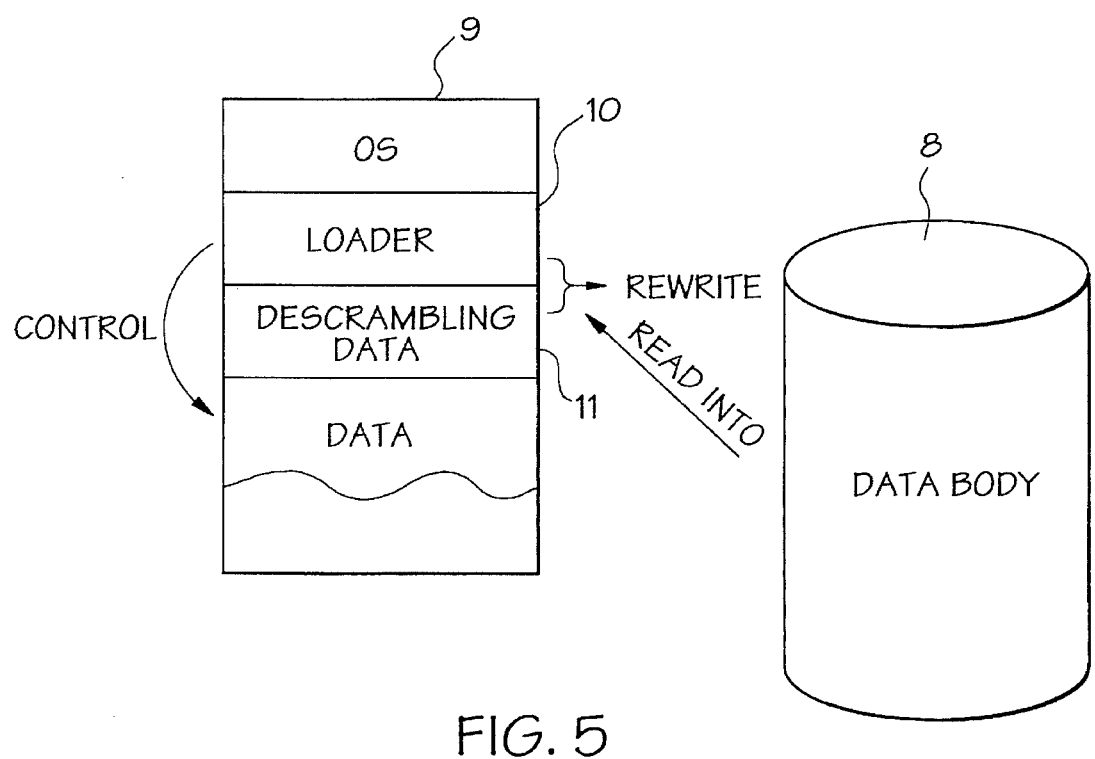
FIG. 5 shows another embodiment, different from that of FIG. 4.

FIG. 5 shows another type of sequence. Calling the loader program in the external memory device 8 initiates reading of the loader program 10 and the descrambling data 11 into the available space of the memory area 9. The loader program 10 reads the data body stored in the external memory device 8 according to the descrambling data 11, and decompressed the data to the available memory space. In this process, the loader program 10 completes at least the decompressing of the scrambled data such as an execution file in the data body. When decoding and transferring are completed, the descrambling data and the loader program are overwritten. To receive a next service, a user is required to acquire the descrambling data and the loader program again. This prevents unauthorized use of data at each terminal. It is perfectly acceptable that either the descrambling data or the loader program is overwritten.

In the above embodiment, substantially improved overall transmission efficiency results since large-sized data is communicated via highly efficient communications system while files for preventing unauthorized use of data are communicated via bidirectional communication networks. This arrangement also achieves improved information management at the host computer. Once the terminal 2 decodes the scrambled data body, the loader program and the descrambling data, needed for decoding process, are deleted or overwritten. This prevents reinitiation of the data body. To reinitiate, the terminal 2 must request another service to the host computer 1. Thus, unauthorized use of data is prevented.

Figure 6:
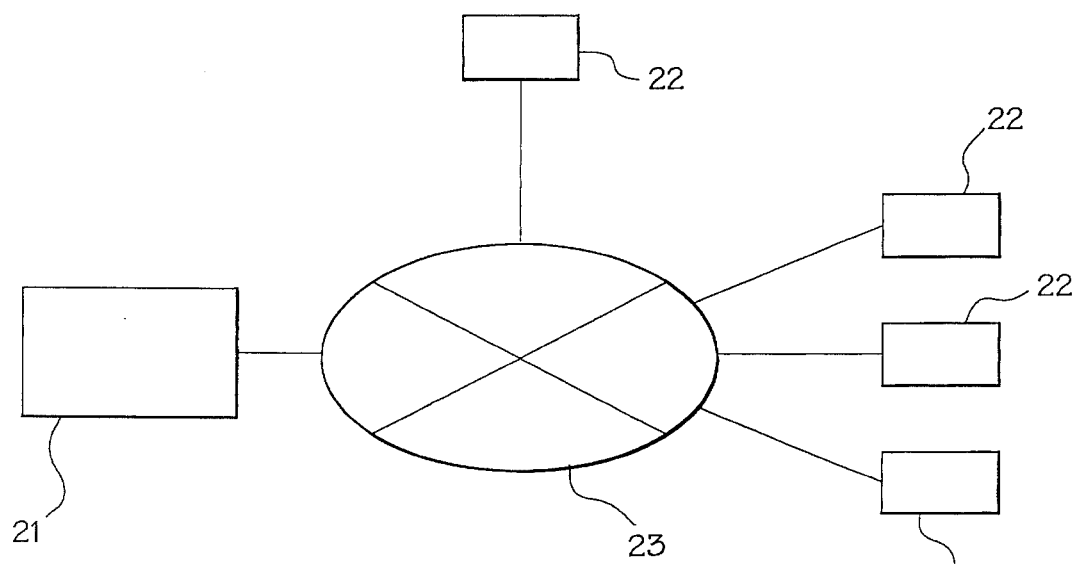
FIG. 6 is a block diagram showing a communications network system using a public communications network.
Figure 7:
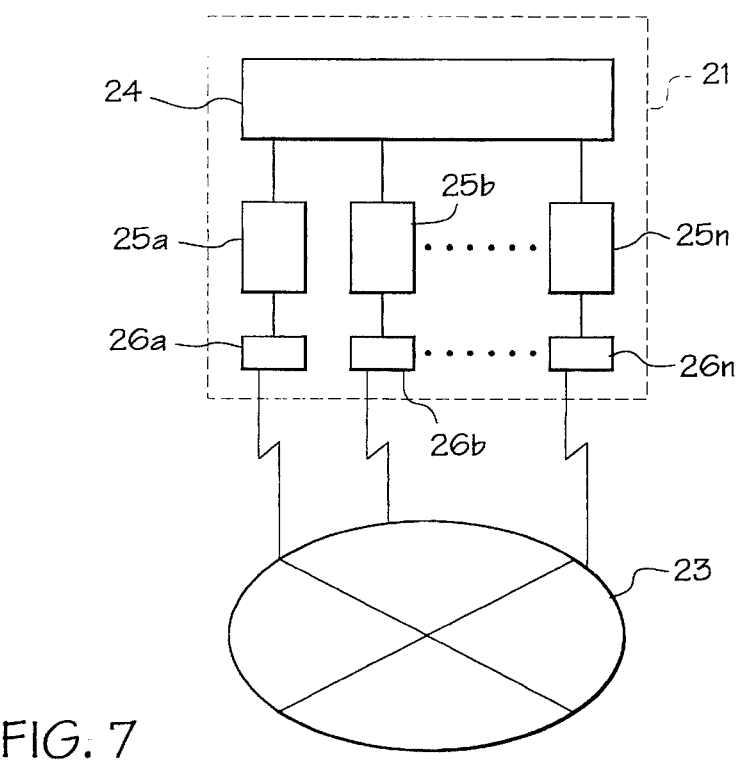
FIG. 7 is a block diagram showing task performing of a CPU.

Discussed next is the arrangement of making varied data transmission rates to a single common rate in communications between a host computer and a plurality of terminals. FIG. 6 shows the host computer and the terminals arranged into a system configuration that embodies the present invention. The host computer 21 is connected to each of the terminals 22 via a public communications network 23. FIG. 7 shows the construction of the host computer 21. The host computer 21 comprises a CPU 24 at its core. Based on the capability of the CPU 24, the host computer 21 processes tasks 25a–25n in a time sharing system. The number of terminals 22 simultaneously accessible to the host computer 21 agrees with n, which is the number of tasks. Modems 26a–26n are provided, correspondingly to the tasks 22a–22n. Modems 26a–26n do not usually agree with the modems of the terminals 22 in data transmission rate (bps). Different rate modems are often paired. The tasks 25a–25n do not reside within the CPU 24, and are increasing or decreasing in response to the number of accessing terminals within the limitation of n terminals at maximum.

Figure 8:
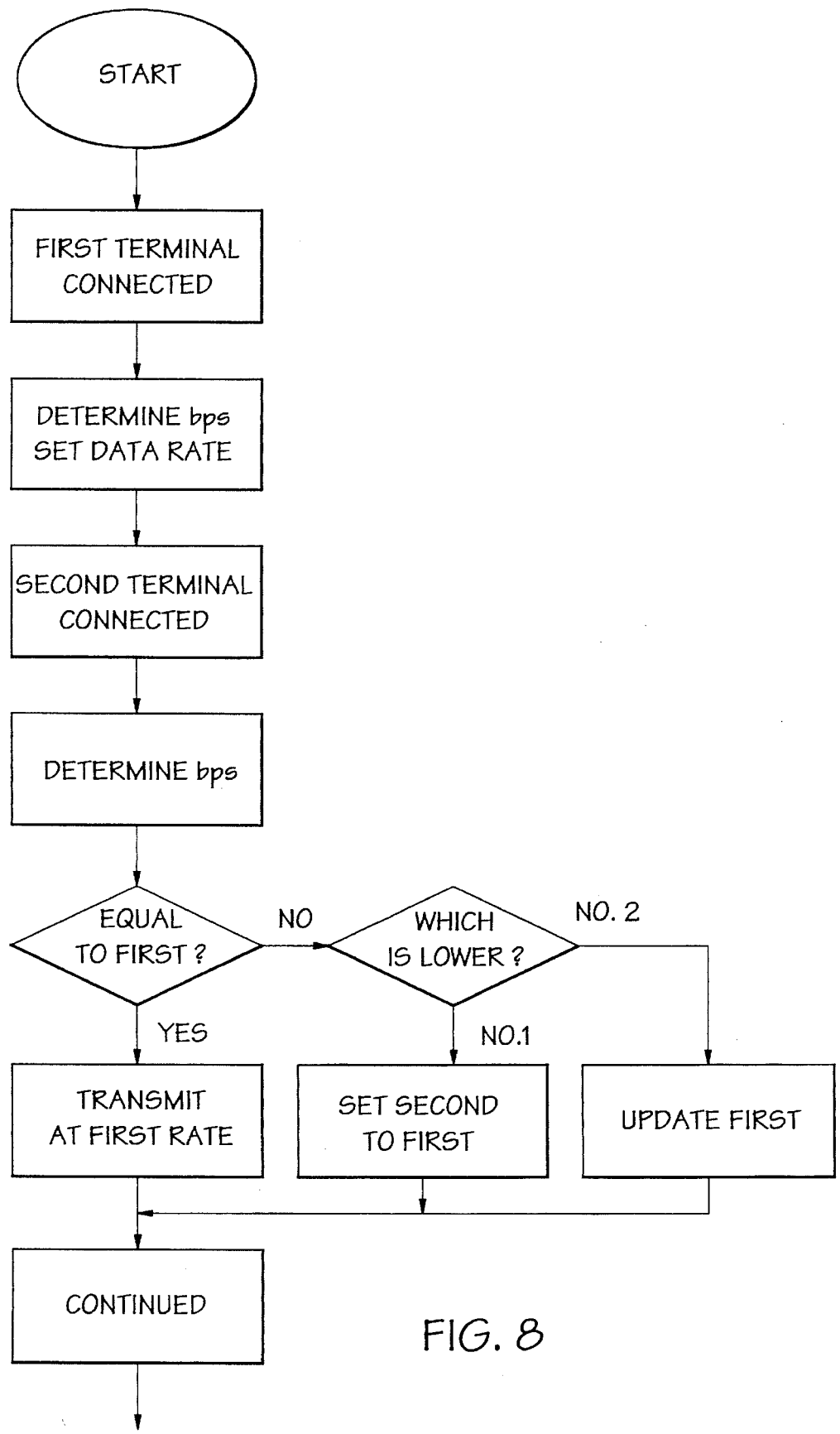
FIG. 8 is a flowchart showing the sequence of the task of FIG. 7.

Assume that the host computer 21 grants simultaneous access to three terminals 22a, 22b, and 22c having data transmission rates 2400 bps, 4800 bps, and 9600 bps, respectively. In prior art systems, the host computer 21 performs communications with terminals 22a, 22b, and 22c at their respective rates. In this embodiment, the host computer 21 communicates with all of the three terminals at 2400 bps, which is the lowest of the three rates. The CPU 24 operates as follows. When a first terminal is connected to the host computer 21, the host computer 21 determines the data transmission rate of the first terminal modem. A second terminal is then connected to the host computer 21 which in turn determines the data transmission rate of the second terminal. If the host computer 21 judges the second rate to be equal to the first rate, the host computer proceeds to next step. If the host computer judges this second rate to be different from the first rate, it proceeds to judge which is slower, and selects the slower rate. The host computer transmits instruction code to any terminal transmitting and receiving at a rate other than the selected rate to force the selected rate to the terminal. Thus, a plurality of terminals are forced to operate in a single common data transmission rate. This sequence is illustrated in FIG. 8.

Figure 9:
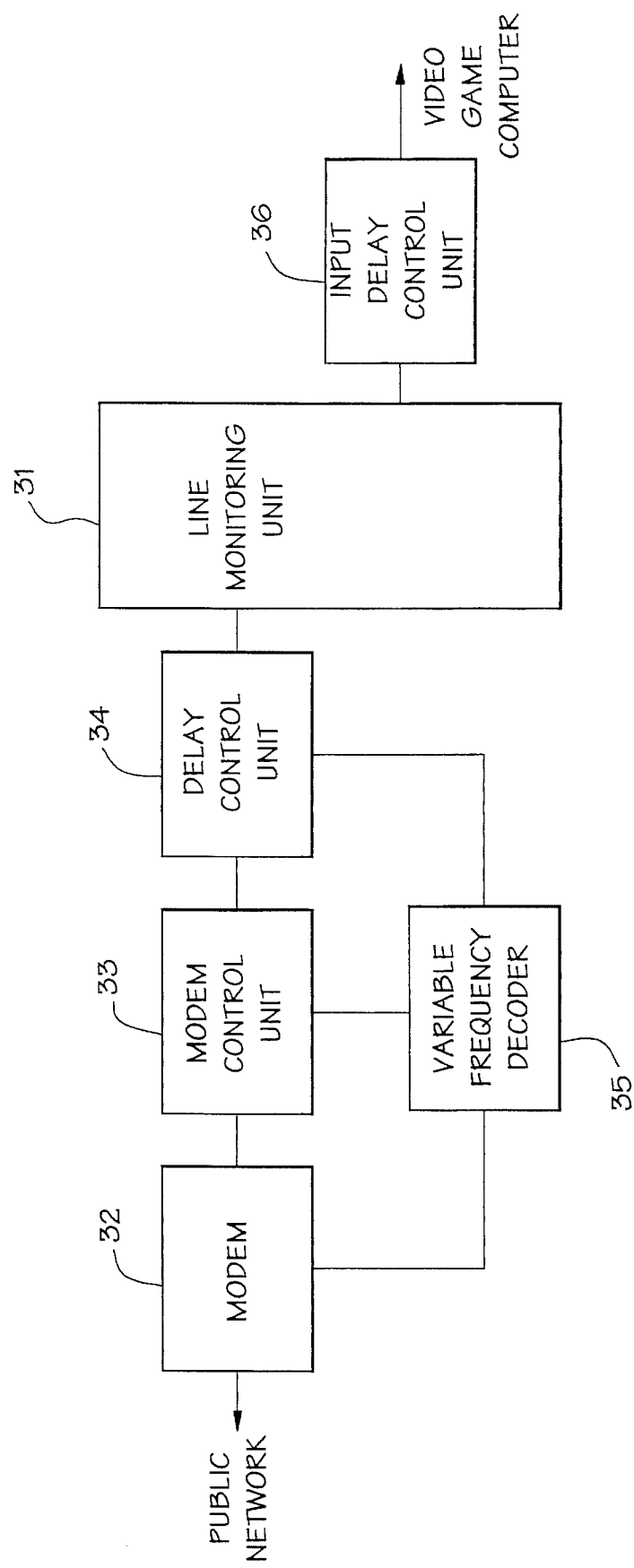
FIG. 9 is a block diagram of a terminal.

FIG. 9 shows a transceiver circuitry of the terminal 22. Shown in FIG. 9 are a line monitoring unit 31, a modem 32, a model control unit 33, a delay control unit 34, and a variable frequency divider 35. Assume that the terminal 22 employs a data transmission rate of 9600 bps, that the terminal 22 initially communicates with the host computer 21 at 9600 and that the host computer 22 instructs the terminal 22 to switch to 2400 bps. The modem control unit 33 in FIG. 9 calculates the ratio of the current data transmission rate to the instructed rate, and outputs a resulting ratio to the delay control unit 34. The delay control unit 34 causes the variable frequency divider 35 to operate at the ratio for feedback to the modem 32. Data transmission rate is thus determined. In this embodiment, the ratio is 9600 to 2400, and the variable frequency divider 35 operates at divide-by-four to slow the data transmission rate. These circuits determine the uplink data transmission rate from the terminal 22 to the host computer 21. The downlink rate is determined by an input delay control unit 36. The input delay control unit 36 controls an input stage (not shown) such as a video game computer, which may be connected to the input delay control unit 36.

In this embodiment, a plurality of terminals are included, and thus a plurality of circuits of FIG. 9 are simultaneously connected to the host computer 21. Each time a new terminal is incorporated in the system, the host computer determines its data transmission rate. Thus, when a plurality of terminals are simultaneously connected to the host computer, the single common rate is applied to all the terminals. Network's own traffic issue aside, communications between the host computer and the terminals are performed under unbiased conditions. This arrangement presents a useful synchronization means in a game playing in which input timing from the participating terminals is critical.

Thus, when a plurality of terminals are essentially simultaneously connected to a host computer, a single common data transmission rate is applied to all the terminals. Each time new terminals are incorporated, the host computer instructs them to select the lowest rate of all the data transmission rates of the connected terminals. At any moment, any connected terminal performs communications with the host computer under unbiased conditions. Variations in data transmission rate among the terminals do not affect the quality of communications. The present invention offers an effective system in such an application where the input timings among a plurality of terminals need accurate judgment.

What is claimed is:

1. A communications apparatus comprising:

a host computer having a scrambled data body, descrambling data, and a loader program;

a plurality of terminals, each of said plurality of terminals having an external memory device;

a unidirectional communications link between said host computer and each of said plurality of terminals; and a bidirectional communications link between said host computer and each of said plurality of terminals;

wherein said host computer sends said scrambled data body to a first one of said plurality of terminals having a first external memory device, over said unidirectional communications link, and said host computer, in response to a request from said first terminal, downloads said descrambling data and said loader program to said first terminal over said bidirectional communications link, wherein said first terminal stores, in said first external memory device, said scrambled data body sent from said host computer, said descrambling data downloaded from said host computer and said loader program downloaded from said host computer one time, and wherein said first terminal downloads said descrambling data and said loader program to available space of a main memory of said first terminal, and said first terminal executes said loader program to descramble said scrambled data body corresponding to said descrambling data.

2. The communications apparatus according to claim 1, wherein said unidirectional communications link is a satellite communication link.

3. The communications apparatus according to claim 1, wherein said bidirectional communications link is a public communications network.

4. The communications apparatus according to claim 1, wherein said bidirectional communications link is an interactive CATV network.

* * * * *